Patented Mar. 16, 1948

2,437,706

UNITED STATES PATENT OFFICE 2,437,706

HYDROBLEACHING GLYCERIDE OILS

William J. Paterson, Newton Highlands, Mass., assignor to Lever Brothers Company, Cambridge, Mass., a corporation of Maine No Drawing. Original application February 19, 1943, Serial No. 476,498. Divided and this application May 18, 1944, Serial No. 536,199

10 Claims. (Cl. 260—409)

The present invention relates to the treatment of glyceride oils or fats which are susceptible to a reduction in color or color and unsaturation. The invention may be used to provide an oil or fat product having a markedly reduced color and, if desired, one which may be hardened simultaneously to any desired degree and may be rendered more stable against the incidence of rancidity.

The invention includes a new kind of catalyst described more particularly hereinafter, having unexpected and novel catalytic properties when used in a process of treating glyceride oils or fats with hydrogen. The invention also includes the application of the catalyst to a process for decolorizing and, if desired, for simultaneously hardening glyceride oils and fats with hydrogen at elevated temperatures and, preferably, under super-atmospheric pressures.

An object in treating glyceride oils or fats, which are adapted to be used in the preparation of high grade commercial oil or fat products such as, for example, plastic shortenings, generally is to reduce the color of the material sufficiently to comply with the commercial standards generally accepted by the industry. Another object generally is to increase the stability of the oil or fat against the incidence of rancidity and to provide a harder product. The attainment of these objects involving as it does the use of expensive materials and equipment, as well as many processing operations for extended periods of time, greatly increases the cost of manufacturing oil or fat products. Moreover, it was not regarded as feasible to materially raise the commercial standards of color, stability and hardness, in view of the inherent limitations of the prior art processes.

The present invention may be utilized to eliminate processing operations and materials which have been deemed essential heretofore in the preparation of high grade oil or fat products and to decrease the amount of time involved in the processing, thereby making the processing easier and more economical. At the same time, oil or fat products may be formed in accordance with the invention having better color, stability and hardness characteristics than that of oils or fat products made by the prior art processes.

The conventional procedure utilized heretofore for improving the color and hardness of crude glyceride oils or fats generally comprises a series of operations, including (1) refining with alkali, (2) re-refining with alkali, (3) bleaching with absorptive agents, such as earths, (4) hydrogena- tion, and (5) de-odorization with steam. Repeated refining steps and bleaching one or more times with earths, carbon, etc., have been the common methods which were employed commercially to eliminate undesirable color. Such operations are material, time, labor and energy consuming and invariably each such operation involves a loss of neutral oil. In accordance with the present invention, it is possible, as discussed hereinafter, to eliminate the steps of re-refining with alkali and bleaching with absorptive agents, and also to materially shorten the time required for hydrogenation; at the same time, it is possible to form a product which is superior in color, hardness, and stability characteristics.

The crude glyceride oils which are commercially available for use in food products, soaps, and the like, are generally dark in color and have a high content of undesirable impurities such as free fatty acids, gums, mucilaginous material, and the like. The initial refining of the oil by subjecting the oil to a treatment with alkali generally a solution of caustic, neutralizes and precipitates the free fatty acids as soaps and at the same time a substantial proportion of gums, mucilaginous materials and coloring matter is coagulated and removed along with the soaps. It is contemplated, in accordance with the present invention, that the oil will be given a preliminary refining treatment with alkali prior to the further treatment of the oil in accordance with the invention.

The re-refining of the oil or fat with a further amount of alkali, as described previously as a part of a conventional process for treating glyceride oils or fats, is required to achieve the desired further improvement in the quality of the finished product, for example, with respect to color; the subsequent step of hydrogenation is also facilitated. A disadvantage of re-refining the oil in accordance with the conventional process, in addition to the fact that it is an additional operation involving additional equipment, labor, and materials, is that an expensive loss results inasmuch as a substantial amount of neutral oil is saponified or entrained in the resulting foots. In accordance with the present invention, however, it is unnecessary to resort to the step of re-refining the oil with caustic alkali and at the same time the final product may be superior in color, stability and hardness as compared with an oil or fat product processed in accordance with the prior art processes including a re-refining operation.

The bleaching of oils or fats with bleaching agents, such as carbon and absorptive earths, is one of the most difficult and expensive treatments accorded glyceride oils in the present commercial processes of preparing them for commercial uses. The bleaching agents themselves are relatively expensive and after admixture with the oil are difficult to remove except by elaborate filtering methods utilizing expensive and complicated equipment. Moreover, the bleaching agents, which remove coloring matter by absorption, also absorb a substantial amount of the oil which cannot be removed by filtering. It is an advantage of the present process that an oil or fat product having a color even superior to that of the prior art products may be prepared without any bleaching of the oil with absorptive agents.

The hardening of glyceride oils and fats, in accordance with the prior art, generally is accomplished by hydrogenation in the presence of a nickel catalyst or similar catalyst. Although hydrogenation proceeds more rapidly and is more selective at high temperatures and pressure, it has been preferred to carry out the hydrogenation, for example, with a nickel catalyst under moderate temperature and pressure conditions to avoid the formation of large quantities of isomerides, such as iso-olein, which are hard brittle fats formed during hydrogenation utilizing a nickel catalyst at high temperatures and pressures. The formation of such isomerides makes the resulting fat harder without lowering its unsaturation and is therefore undesirable. The prior art processes of hydrogenation, particularly at the moderate temperature and pressure conventionally utilized, are relatively slow and require long periods of time to achieve the desired extent of hardening. It is an advantage of the present invention that in addition to the color improvements, a highly selective hardening of the oil may be accomplished under relatively high temperature and pressure conditions, if desired, and in a relative short period of time, without the formation of a product having a high iso-olein content. As a matter of fact, it is possible by the practice of the present invention to form a bleached and hardened oil product having a lower iodine value and a smaller proportion of the more unsaturated components, such as linolein, (if these are present in the oil being treated) than a product having the same degree of hardness prepared in accordance with the prior art. This illustrates the very selective hardening action when the invention is employed to harden as well as remove color from the oil. As a result, the oil or fat may be made more saturated and more stable at a desired degree of hardness, or conversely may be made softer at a desired degree of stability. The degree of hardening obtained in accordance with the present invention may be readily controlled over a wide range, so that the oil may be decolorized to a greater degree than by the use of relatively costly bleaching treatments conventionally utilized heretofore without any substantial hardening, or if desired, the optimum decolorization may be accompanied by a selective hardening to any extent desired.

When necessary, a final de-odorization step which comprises subjecting the oil or fat to a flow of steam is utilized to remove undesirable odors and provide a bland and sweet product. The present invention contemplates the use of a final de-odorization step utilizing steam, in accordance with the previous practices, whereby undesirable odors in the oil may be removed.

In accordance with the present invention, the glyceride oil or fat, preferably after preliminary refining with alkali, in accordance with the prior art, is subjected to treatment with hydrogen, preferably at super-atmospheric pressure in the presence of a catalyst to be described more particularly hereinafter, while the oil is at an elevated temperature. The conditions under which the operation is carried out and the particular species of the catalyst selected, as described hereinafter, may be varied depending upon the results which it is desired to obtain. If desired, the oil may be decolorized even to a degree superior to that possible heretofore by the use of bleaching agents, without materially decreasing the unsaturation of the oil. On the other hand, if desired, the decolorization of the oil or fat may be accompanied by selective hardening of the oil to any desired degree of saturation and without an objectionable increase in the isomeride and unsaponifiable contents of the oil or fat. It is intended that the invention also will include the use of the process disclosed herein primarily for the purpose of decolorization in combination with a preceding or subsequent hardening step carried out by utilizing a conventional prior art hardening method, but it will be apparent from the disclosure hereinafter that it is more advantageous to effect a hardening of the oil or fat, if desired, simultaneously with the decolorization, than to carry out these two operations separately.

A further advantage of the invention is that the decolorization alone or the decolorization and hardening is not accompanied by the formation of appreciable amount of unsaponifiable compounds which are undesirable in an oil or fat, particularly if it is intended for edible purposes.

The invention has the additional advantage that the catalyst used is made from relatively inexpensive and plentiful metals and can be made by a simple method to obtain readily duplicate results. The decolorization or simultaneous hardening of oils and fats can be carried out simply in a fool-proof method.

The catalyst of the present invention may be used if desired for reducing the color of the oil or fat without materially hardening the same, as is explained above. For convenience, this catalyst is denoted herein by the term "hydrobleaching catalyst" and the process of reducing the color of the oil will be denoted by the term "hydrobleaching." In accordance with the invention, the catalyst may be modified to permit the oil or fat to be hardened simultaneously with the hydrobleaching. This latter catalyst will be denoted hereinafter by the term "promoted hydrobleaching catalyst."

The hydrobleaching catalyst of the present invention comprises the mixed oxides or oxygen containing salts of iron and at least one metal selected from the minor sub-group of group I of the periodic classification. The minor sub-group of group I of the periodic classification comprises copper, gold and silver. Merely for convenience and simplicity of presentation, the hydrobleaching catalyst will be designated herein by the general formula Fe-X-O in which Fe denotes iron and X denotes at least one metal of the group consisting of copper, gold, and silver. The symbol O denotes oxygen in the form of an oxide, hydroxide or oxygen containing salt such as, for example, a carbonate.

The formulae set forth herein are utilized merely for convenience and brevity in denoting the catalysts used. The formulae are not intended to be empirical, i. e., they do not signify the relative amounts of the elements present. Furthermore, they are not intended to indicate the way the elements are linked together inasmuch as the catalyst may be a single compound or a mixture of compounds or elements and compounds, nor are they intended to be limited to the elements specified inasmuch as, for example, the oxygen may be present as oxide, hydroxide, carbonate or other oxygen containing salt. It is not intended that the invention shall be limited by any theory as to the particular chemical or physical combination of the elements disclosed. In general, however, as discussed more fully hereinafter, the iron and copper, gold or silver preferably are coprecipitated in the form of oxygen containing salts such as, for example, in the form of carbonates or hydroxides and may be used in this form or may be ignited to form oxides prior to use.

The iron and the copper, gold or silver ratio may be varied over a wide range. For convenience, it may be preferred to utilize a substantially molal ratio of the metals, this ratio being satisfactory for most purposes. For the purposes of illustration in describing the invention more particularly, a catalyst comprising iron and copper and in substantially molal ratio will be utilized. It is to be understood, however that this is done merely for convenience and it is not intended that the invention will be limited to the particular species of catalyst selected merely by way of illustration.

As a specific example of the preparation of an iron and copper containing hydrobleaching catalyst (Fe-Cu-O), in accordance with the present invention, a solution may be prepared of 100 parts $CuSO_4.5H_2O$ and 111 parts $FeSO_4.7H_2O$ in 1000 parts water. The solution then may be agitated at about 75° C. while a solution of 148 parts $NaHCO_3$ in 1500 parts water is slowly added. The co-precipitated basic carbonates may be filtered and washed fairly free of sodium sulfate. The precipitate may be dried, for example, at about 105° C. and may be ground and screened, for example, through a No. 120 mesh. If desired, the catalyst may be ignited at any suitable temperature, for example, in the range of 200 to 350° C. to form an oxide or the catalyst may be used in the precipitated oxygen containing salt form, i. e., unignited. A comparison of the results obtained by utilizing a catalyst ignited at various temperatures and unignited (in the form of a hydroxide or oxygen containing salt such as a carbonate) has indicated that for the purposes of the present invention, the treatment of the catalyst subsequent to precipitation is not critical. Furthermore, no difficulty has been experienced in duplicating the results obtained.

When the catalyst is to be utilized for the purpose of simultaneously hardening the oil during hydrobleaching, it is preferred to include in the catalyst at least one hydrogenating metal or its salts or oxides, such as nickel, cobalt, palladium or platinum. For convenience, the promoted hydrobleaching catalyst will be designated herein by the general formula "Y-Fe-X-O" in which the Fe, X and O denote the same elements as in the hydrobleaching catalyst described above and "Y" stands for at least one of the hydrogenating metals such as nickel, cobalt, palladium or platinum. It is not intended that the invention should be limited to any particular combination of the hydrogenating metal with the other elements in the hydrobleaching catalyst. It has been found, for example, that satisfactory results may be obtained merely by adding catalytic nickel, such as is produced, for example, according to the patent to Paterson No. 2,123,342, or the hydrogenating metal may be in the form of a salt or oxide. The manner in which the hydrogenating metal or its salt or oxide is added to the catalyst is not critical, and, for example, if an ignited catalyst is desired, it may be added to the hydrobleaching catalyst either prior or subsequent to ignition. In general, however, it is preferred to precipitate the nickel or other hydrogenating metal in the promoted catalyst simultaneously with the precipitation of the iron and copper or other metal of the group of group I of the periodic classification. By so doing, it has been found that the characteristics of the catalyst with respect to selectivity are improved. Regardless of the form in which the hydrogenating metal is present, however, hardening of the oil results in a product which has a lower iodine value than the same oil hydrogenated to the same degree of hardness by utilizing a hydrogenating metal alone in accordance with the prior art thereby indicating that the selectivity of the hydrogenating metal in the catalyst of the present invention is unexpectedly improved in that the formation of iso-olein is repressed even at high temperatures and pressures.

The amount of hydrogenating metal which it is preferred to utilize in accordance with the present invention is relatively small and in general is materially less than that which would be required to obtain hardening if the metal were utilized alone. The ratio of the hydrogenating metal to the remaining metals in the catalyst may be varied over a wide range but, in general, a ratio of the order of as little as about $\frac{1}{200}$ mole or less of the hydrogenating metal such as, for example, nickel, to one mole each of the remaining metals such as, for example, iron and copper may be used. Larger amounts or proportions of the hydrogenating metal may be used, for example, to increase the hydrogenating action and depending upon the particular metals selected for the remainder of the catalyst as discussed above. For example, desirable results have been obtained with the use of the order of about $\frac{1}{5}$ to $\frac{1}{100}$ mole of hydrogenating metal to about one mole of each of the other metals. In general, and depending upon the metals selected, an amount of hydrogenating metal above about ½ mole to one mole of each of the other metals is not preferred inasmuch as the hydrogenation tends to proceed too rapidly and thus is not easily controlled. Expressed in terms of the total weight of the catalyst, 1% of a hydrogenating metal such as, for example, nickel, is equivalent, in general, to a ratio of about $\frac{1}{40}$ mole of the hydrogenating metal to about one mole of each of the other metals.

As a specific example of the preparation of such a co-precipitated promoted hydrobleaching catalyst,

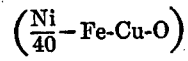

which is given merely by way of illustration, a solution may be prepared containing 125 parts $CuSO_4.5H_2O$, 139 parts $FeSO_4.7H_2O$ and 3.25 parts $NiSO_4 6H_2O$ dissolved in 2000 parts water. While the solution is maintained at 70° C. and agitated, a solution of 185 parts of $NaHCO_3$ in 2000 parts warm water may be slowly added. As in the previous example of the preparation of a hydrobleaching catalyst, the precipitate may be filtered and washed fairly free of sodium sulfate whereupon it may be dried, ground and screened, for example, through a No. 120 mesh. If desired, the catalyst may be ignited at any desired temperature or may be utilized in an unignited condition, i. e., in the form of an oxygen containing salt, in this case a carbonate.

In accordance with the present invention, the catalyst is utilized with the oil or fat at an elevated temperature and preferably at superatmospheric pressure. The conditions utilized may be varied over a wide range as discussed hereinafter depending upon the results which it is desired to obtain.

If desired, the process described herein may be carried out as a batch type of operation which involves the use of readily understood equipment and techniques. It will be appreciated from the description, however, that the process is not limited to a batch type of operation and may be carried out in a continuous or semi-continuous manner, if desired, for example, as described more particularly hereinafter.

The actual mechanics of carrying out the process of the present invention are not critical and, in general, the procedure followed in conventional hydrogenation operations, for the most part, may be applicable. In general, the desired amount of the selected catalyst is added to the oil or fat to be treated and preferably is thoroughly dispersed therein by agitation which, if desired, may be continued during the hydrobleaching. The oil or fat preferably is treated in a vessel provided with means for maintaining the desired temperature conditions and to which hydrogen may be admitted, preferably under pressure. After the hydrobleaching has been completed, the catalyst may be filtered from the oil or fat and the oil or fat may then be deodorized with steam and otherwise treated in accordance with the finishing operations of the prior art.

The amount of catalyst which is utilized, in accordance with the invention, will preferably be in the range of about 0.05 to 0.2% and generally not in excess of about 0.5% based on the weight of the oil or fat. When larger amounts of catalyst are used, the reaction generally proceeds more rapidly and presents difficult problems of control. When amounts of catalyst smaller than given above are used, the rate of reaction may be decreased beyond that which is economical. In general, the time required for the reaction to go to the desired extent will vary inversely with the amount of catalyst utilized and the amount of catalyst may be varied depending upon the oil being treated, the operating conditions, and the results which it is desired to obtain.

The pressure under which the process is carried out also affects the time required for the reaction and may vary from about atmospheric to 200 atmospheres or more. The operable upper limit of pressure possibly may be determined by the limitations of the apparatus utilized. In general, it is desired to carry out the process at relatively high pressures of the order of 2000 pounds per square inch, inasmuch as by so doing the carrying out of the process is expedited. In general, the time required will vary inversely with the amount of pressure utilized. Lower pressures may be utilized advantageously if this is found to be more convenient.

The temperature at which the process is carried out is preferably in the range of about 170° to 250° C. At temperatures below this range, the rate of hydrobleaching is materially decreased and in general is unsatisfactory for accomplishing the purposes of the present invention economically. At higher temperatures, there is the danger of forming unsaponifiables which are undesirable in a good grade product and also, care must be taken at higher temperatures to avoid thermolytic destruction of the oil or fat.

By observing the preferred limitations as to temperature, pressure and amount of catalyst as described above, it has been found that the hydrobleaching or hydrobleaching and hardening may be carried out to a satisfactory degree in a relatively short period of time of the order of not more than 60 minutes and preferably not more than about 15 to 30 minutes. Inasmuch as the rate of reaction may be increased by control of the operating conditions, it will be apparent that time factor may be varied over a wide range. Furthermore, because the rate of reaction may be made conveniently high without undesirable results the invention may be practiced advantageously in a continuous manner.

In order that the invention may be more readily understood, the following specific examples of a batch type of operation are set forth for the purposes of illustration, but they are not to be construed as a limitation upon the scope of the invention.

Example I

As a specific illustration of the improved results which may be obtained by the use of the hydrobleaching catalyst in accordance with the present invention, 0.2% of an unignited catalyst containing co-precipitated iron and copper (Fe-Cu-O) in the form of an oxygen containing salt prepared in accordance with the specific example given above, was admixed with a refined cottonseed oil having a color of 35 yellow-5.8 red on the Lovibond scale using a 5¼ inch column, and having an iodine value of 108. The oil was subjected to a temperature of about 200° C. and an initial hydrogen pressure of about 1800 pounds per square inch. After about 30 minutes, the oil was found to have an iodine value of 93.1 and a color of 1 yellow-0.1 red measured on the same scale. This is substantially water-white.

Example II

A refined palm oil having an iodine value of 53 and a very red color was treated in substantially the same way as in Example I to provide a product having an iodine value of 47 and a color of 8 yellow and 1 red which is considered extremely good for palm oil. Equivalent results were obtained utilizing a catalyst ignited at elevated temperatures for about one hour to form an oxide, and by other species of the hydrobleaching catalyst.

Example III

As a specific illustration of the improved results which may be obtained by the use of the promoted hydrobleaching catalyst in accordance with the present invention, an ignited catalyst containing iron, copper and nickel $$\left(\frac{Ni}{40} - Fe\text{-}Cu\text{-}O\right)$$

prepared in accordance with the method given above was tested on refined cottonseed oil in the same manner as described in Example I. In only one minute the oil was hydrogenated to 65.4 iodine value and the color of the product was 2 yellow-0.2 red.

The product produced in accordance with Example III had a hardness penetration (as determined on an arbitrary scale) of 240 at 20° C. as compared with the lower penetration (harder) of 202 for an oil hardened to the same iodine value utilizing a selective nickel catalyst at lower temperature and pressure in accordance with the teaching of the patent to Paterson No. 2,123,342. It is thus seen that the process of the present invention even when carried out with a catalyst containing nickel at high temperature and pressure is hightly selective and does not form large quantities of iso-olein in the oil. As a result, it is possible to form a more saturated and stable product at the same degree of hardness, or conversely stated, a softer product for the same iodine value.

*Example IV*

As an illustration of the use of another species of the promoted hydrobleaching catalyst in accordance with the present invention, 0.2% of an ignited catalyst containing co-precipitated cobalt, iron and copper

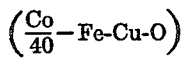

$$\left(\frac{Co}{40} - Fe\text{-}Cu\text{-}O\right)$$

prepared in accordance with the method given above was utilized in the treatment of a sample of refined cottonseed oil as described in Examples I and III. At the end of eight minutes, the color of the oil was 2 yellow-0.1 red, i. e., substantially water-white, and the iodine value of the oil was reduced to 71.

Results similar to those observed in connection with the foregoing examples may be obtained by utilizing catalysts which are not ignited prior to use, i. e., in the form of oxygen containing salts. The foregoing specific examples have been given merely by way of illustration and to assist in the understanding of the invention and are not intended to be a limitation upon the scope of the invention. It will be apparent to one skilled in the art in view of the present disclosure of the invention, that many of the conditions of operation set forth in the specific examples, such as temperature, pressure, time intervals, amount of catalyst and proportion of metals in the catalyst, may be varied as described herein, depending upon the results it is desired to attain. Moreover, the foregoing examples are merely illustrative of the various species of catalyst which may be utilized and as described above, many other species may be used with desirable results. For example, a sample of the cottonseed oil treated in the above examples was reduced in color to 1 yellow-0.1 red utilizing a catalyst containing iron and silver in molal relationship in accordance with the method set forth in Example I. As described above, hardening of the oil may also be accomplished in addition to the decolorization by including a suitable amount of a hydrogenating metal such as nickel.

For convenience, the foregoing examples have been selected as illustrative of the carrying out of the invention in a batch type of operation. It is to be understood, however, that at least equally desirable results may be attained by carrying out the invention in any convenient continuous or semi-continuous manner. If desired, for example, a continuous process may be carried out, with the use of a massive type catalyst or, if desired, the catalyst may be in a finely divided form and suspended in the oil. The following are examples merely by way of illustration, of the carrying out of the process in a continuous manner.

*Example V*

In this example of carrying out the process of the invention in a continuous manner, the desideratum was to obtain good bleaching with only slight hydrogenation. The oil treated was refined cottonseed oil having a color of 35 yellow-6.7 red and an iodine value of 108. The catalyst employed was co-precipitated iron and copper (Fe-Cu-O) prepared in accordance with the specific example given above and ignited at 350° C. About 0.2% of the catalyst based on the weight of the oil was suspended in the oil, and the catalyst containing oil then was pumped along with hydrogen through a preheater which raised the temperature of the mixture to 185-190° C. The oil was pumped at a rate of 5 lbs. per hour and the hydrogen at 1 cubic foot per minute measured at normal temperature and pressure. After preheating, the mixture entered a baffle reaction chamber which permitted a hold-up or reaction time of about 15 minutes with the hydrogen bubbling throughout oil. The mixture then passed through a cooler which reduced the temperature to 70° C. and then to a vessel in which oil and hydrogen separated and from which the product could be periodically withdrawn. The pressure of hydrogen was maintained at 2,000 lbs. per square inch throughout the run. Under these conditions, the oil was bleached to a color of 2 yellow-0.2 red and was hydrogenated to an iodine value of about 102.

*Example VI*

In this example of carrying out the process of the invention in a continuous manner, it was desired to obtain good bleaching with sufficient hardening of a sample of the same oil treated in Example V. The catalyst employed, therefore, was a promoted iron and copper containing catalyst. In this example, the oil was admixed with 0.2% based on the weight of the oil of a co-precipitated nickel, iron and copper-containing catalyst in which the ratio was ½₀₀ mole of nickel to one mole of iron and one mole of copper. The catalyst had been ignited at a temperature of about 350° C. With the exception of the kind of catalyst used, the process was carried out exactly in the same manner as set forth in Example V. The final product was found to be bleached to a color of 1 yellow-0.1 red and was hydrogenated to an iodine value of 70. The results obtained in this run are illustrative of an ideal type of hydrobleaching and hardening as may be desired in the manufacture, for example, of edible plastic fat products.

*Example VII*

In this example, the process was carried out in exactly the same manner and with a sample of the same oil used in Example VI except that the catalyst was not ignited before use. The final product had the same color values as the product in Example VI and the oil was found to have an iodine value of 60 and thus was hydrogenated to a slightly higher degree.

It will be noted that in the foregoing specific examples relating to a continuous type of operation in accordance with the invention, the oil containing catalyst was preheated in the presence of hydrogen under pressure. In order to carry out the continuous process successfully, it is deemed preferable to preheat the oil in this manner, as the results may not be as satisfactory when the oil is first preheated and thereafter caused to react with hydrogen under pressure.

In accordance with the foregoing examples of the carrying out of the process of the present invention in a continuous manner, the hydrogenating activity of the catalyst may be slightly more pronounced in the continuous process as compared with a batch type of operation. In a continuous type of operation, therefore, when hardening of the oil is desired, a smaller amount of the promoter, i. e., the hydrogenating metal, possibly may be used to obtain the same degree of hardening.

As illustrated in Examples VI and VII the unignited catalyst may be somewhat more active than the ignited catalyst and, therefore, as a general rule there may not be an advantage warranting the additional step of igniting the catalyst to form an oxide. However, as set forth above, desirable results may be obtained by the use of an ignited catalyst and, therefore, this type of catalyst may be used if desired.

The improved results which may be obtained by the use of the hydrobleaching or promoted hydrobleaching catalyst of the present invention are unexpected and cannot be predicted by a consideration of the results obtainable by the use of the components individually. For the purposes of illustration, the following table shows the results which may be obtained by treating a cottonseed oil having a color of 35 yellow-6.5 red and an iodine value of 107 at 200° C. at an initial hydrogen pressure of 1800 lbs. per square inch in the presence of a hydrobleaching or promoted hydrobleaching catalyst of the present invention and with catalysts consisting of the separate components.

*Table I*

| Test No. | Catalyst | Time, Mins. | I. V. | Color Y | Color R |
|---|---|---|---|---|---|
| 1 | 0.2% Fe-Cu-O | 30 | 94.8 | 2 | 0.2 |
| 2 | 0.2% $\frac{Ni}{40}$—Fe-Cu-O (coprecipitated) | 1 | 65.4 | 2 | 0.2 |
| 3 | 0.003% Ni-O | 30 | 107 | 25 | 2.1 |
| 4 | 0.1% Fe-O | 30 | 107 | 18 | 3.2 |
| 5 | 0.1% Cu-O | 30 | 107 | (1) | (2) |
| 6 | 0.003% Ni-O+0.1% Fe-O+0.1% Cu-O (mixed after ignition) | 30 | 107 | (1) | (2) |
| 7 | 0.1% Fe-O+0.1% Cu-O (carbonates mixed before ignition) | 30 | 107 | (1) | (2) |
| 8 | 0.003% Ni-O+0.1% Fe-O+0.1% Cu-O (carbonates mixed before ignition) | 30 | 107 | 30 | 7.0 |

1 Quite.
2 Red.

Referring to the above table it will be apparent that exceptional color removal was obtained by the use of a coprecipitated-iron-copper-oxide catalyst (test No. 1) and that adequate hydrogenation in addition to the same degree of decolorization also was effected in the presence of a coprecipitated nickel-iron-copper-oxide catalyst (test No. 2). The components themselves or when separately precipitated as shown in tests Nos. 3-8, however, gave neither adequate color reduction nor hardening.

In order that the improved results obtainable in accordance with the present invention may be more readily appreciated, the results obtained by a conventional earth bleaching operation followed by a conventional hydrogenation step with a nickel catalyst, have been compared with the results which may be obtained by the use of a promoted hydrobleaching catalyst in accordance with the present invention and without preliminary bleaching with absorptive agents. The material treated in each instance was a shortening stock prepared from a mixture of three vegetable oils. The mixed oils possessed a Lovibond color of 70 yellow-5.9 red, utilizing a 5¼ inch column. One sample of the mixed oils was treated in accordance with the present invention at 200° C., using 0.2% of a catalyst having the atomic ratio of substantially $$\frac{Ni}{15} - Fe-Cu-O$$

prepared in accordance with the description above. The initial hydrogen pressure was about 1800 pounds per square inch. In the preparation of the other sample, the same oils were bleached individually with absorptive clays and carbon, and then hydrogenated with nickel in accordance with the prior art, following the technique shown in the patent to Paterson, No. 2,123,342. The results obtained were as follows:

*Table II*

|  | Hydrobleached Shortening | Commercial Shortening |
|---|---|---|
| Original Color | 70Y-5.9R | 70Y-5.9R. |
| Earth Bleaching | None | Yes. |
| Catalyst Used | $\frac{Ni}{15}$—Fe-Cu-O | Ni. |
| Temperature | 200° C | 120° C. (approx.) |
| Hydrogen Pressure | 1800 lbs./sq. in. (initial) | 10 lbs./sq. in. (approx.). |
| Hardening Time | 10 minutes | About 2 hours. |
| Color | 2Y-0.2R | 6Y-0.6R. |
| Per Cent F. F. A. (as Oleic) | .014 | .015. |
| Flavor | V. Good | V. Good. |
| Heat Test (180° C.) | Good | Good. |
| Iodine Value | 66.4 | 69.1. |
| Kaufmann No | 57.8 | 58.5. |
| Per Cent Linolein | 9.9 | 11.1. |
| Hardness (Penetration at 20° C.) | 241 | 218. |

It will be apparent from the above table that the oil treated in accordance with the present invention became much lighter in color than the product treated in accordance with the commercial practice, which included an expensive bleaching operation before hydrogenation. It will also be noted that, although the two products have essentially the same hardness, the product prepared in accordance with the present invention has a lower iodine value and less residual linolein and, as a result, is rendered more stable against the incidence of rancidity. This indicates that the catalyst is highly selective at high temperatures and pressures and at the same time, even though nickel is present, there is no disadvantageous formation of iso-olein which would be the expected result when nickel is utilized at high temperatures and pressures.

Another important advantage of the present invention is demonstrated by the above test results in that the superior results were obtained in about 10 minutes as compared with the two hours required in accordance with the commercial practice, which does not include the additional great amount of time required for the bleaching operation.

In view of the foregoing disclosure, it will be apparent that the invention possesses exceptional utility in the treatment of oils and fats. It is understood that the invention may be susceptible to many variations by one skilled in the art and all such variations are intended to be within the scope of the invention.

This application is a division of my pending application Serial No. 476,498, filed February 19, 1943.

I claim:

1. A process for hydrobleaching glyceride oils comprising treating the oil at a temperature of the order of about 170 to 250° C. with hydrogen under superatmospheric pressure for not more than about 60 minutes in the presence of not more than about 0.5% of a coprecipitated catalyst having the general formula Fe-X-O in which X represents at least one metal selected from the group consisting of copper, silver and gold.

2. A process for hydrobleaching glyceride oils comprising treating the oil with hydrogen at a pressure in the range of atmospheric to 200 atmospheres in the presence of a small amount of a coprecipitated catalyst having the general formula Fe-X-O in which X represents at least one metal selected from the group consisting of copper, silver and gold, and at a temperature of at least 170° C. but below the temperature at which the said oils are thermolytically destroyed.

3. A process for hydrobleaching glyceride oils which comprises treating the oil with hydrogen in the presence of a catalyst having the general formula Fe-X-O in which X represents at least one metal selected from the group consisting of copper, silver and gold, and at an elevated temperature at which the oil is bleached but below the temperature at which the oil is thermolytically destroyed.

4. A process for hydrobleaching glyceride oils comprising subjecting the oil to the action of hydrogen in the presence of a coprecipitated catalyst having the general formula Fe-X-O in which X represents at least one metal selected from the group consisting of copper, silver and gold, and at a temperature of at least 170° C. but below the temperature at which the said oils are thermolytically destroyed.

5. A process for hydrobleaching glyceride oils which comprises treating the oil at a temperature of the order of about 170 to 250° C. with hydrogen at a pressure in the range of atmospheric to 200 atmospheres for not more than about 60 minutes in the presence of a coprecipitated catalyst having the general formula Fe-X-O in which X represents at least one metal selected from the group consisting of copper, silver and gold, said iron and said metal represented by the symbol X being present in substantially molal proportions.

6. A process for hydrobleaching glyceride oils which comprises treating the oil at a temperature of the order of about 170 to 250° C. with hydrogen under superatmospheric pressure in the presence of not more than about 0.5% based on the weight of the oil of a coprecipitated catalyst having the general formula Fe-X-O in which X represents at least one metal selected from the group consisting of copper, silver and gold.

7. A process for hydrobleaching glyceride oils comprising treating the oil at a temperature of at least 170° C. with hydrogen under superatmospheric pressure in the presence of a small amount of a coprecipitated catalyst having the general formula Fe-X-O in which X represents at least one metal selected from the group consisting of copper, silver and gold, and at a temperature of at least 170° C. but below the temperature at which the said oils are thermolytically destroyed.

8. A process for hydrobleaching glyceride oils which comprises treating the oil at a temperature of about 200° C. with hydrogen at a pressure of about 135 atmospheres for a period of time not substantially exceeding 15 to 30 minutes in the presence of about 0.2% based on the weight of the oil of a coprecipitated catalyst having the general formula Fe-X-O in which X represents at least one metal selected from the group consisting of copper, silver and gold, said iron and said metal represented by the symbol X being present in a substantially molal ratio.

9. A process for hydrobleaching glyceride oils which comprises treating the oil with hydrogen at a pressure in the range of atmospheric to 200 atmospheres in the presence of a coprecipitated catalyst having the general formula Fe-Cu-O, and at a temperature of at least 170° C. but below the temperature at which the said oils are thermolytically destroyed.

10. In a process of hydrobleaching glyceride oils which comprises treating the oil at an elevated temperature with hydrogen in the presence of a coprecipitated catalyst having the general formula Fe-X-O in which X represents at least one metal selected from the group consisting of copper, silver and gold, the steps comprising mixing the catalyst with the oil, continuously preheating the oil containing catalyst in the presence of hydrogen under pressure, continuously passing the preheated oil containing catalyst and hydrogen through a reaction zone under pressure and at an elevated temperature at which the oil is bleached but below the temperature at which the oil is thermolytically destroyed, and thereafter separating the oil from the catalyst and hydrogen.

WILLIAM J. PATERSON.

REFERENCES CITED

The following references are of record in the file of this patent:

UNITED STATES PATENTS

| Number | Name | Date |
| --- | --- | --- |
| 1,546,381 | Harris | July 21, 1925 |
| 2,073,578 | Gwynn | Mar. 9, 1937 |
| 2,123,332 | Godfrey | July 12, 1938 |
| 1,268,692 | Dewar et al. | June 4, 1918 |
| 1,865,770 | Larson | July 5, 1932 |

Certificate of Correction

Patent No. 2,437,706.    March 16, 1948

WILLIAM J. PATERSON

It is hereby certified that errors appear in the printed specification of the above numbered patent requiring correction as follows: Column 3, line 41, for the word "relative" read *relatively*; column 9, line 11, for "hightly" read *highly*; column 14 lines 2 and 3, strike out "at a temperature of at least 170° C."; and that the said Letters Patent should be read with these corrections therein that the same may conform to the record of the case in the Patent Office.

Signed and sealed this 25th day of May, A. D. 1948.

[SEAL]

THOMAS F. MURPHY,
*Assistant Commissioner of Patents.*